United States Patent
Asaro et al.

(10) Patent No.: US 8,984,511 B2
(45) Date of Patent: Mar. 17, 2015

(54) VISIBILITY ORDERING IN A MEMORY MODEL FOR A UNIFIED COMPUTING SYSTEM

(75) Inventors: Anthony Asaro, Toronto (CA); Kevin Normoyle, Los Gatos, CA (US); Mark Hummel, Franklin, MA (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 224 days.

(21) Appl. No.: 13/588,310

(22) Filed: Aug. 17, 2012

(65) Prior Publication Data

US 2013/0263141 A1    Oct. 3, 2013

Related U.S. Application Data

(60) Provisional application No. 61/617,470, filed on Mar. 29, 2012.

(51) Int. Cl.
| | |
|---|---|
| G06F 9/46 | (2006.01) |
| G06F 13/00 | (2006.01) |
| G06F 12/00 | (2006.01) |
| G06F 13/28 | (2006.01) |
| G06F 9/26 | (2006.01) |
| G06F 9/34 | (2006.01) |
| G06F 9/52 | (2006.01) |

(52) U.S. Cl.
CPC ... *G06F 9/46* (2013.01); *G06F 9/52* (2013.01)
USPC ........... 718/100; 718/101; 718/102; 718/104; 718/106; 711/147; 711/148; 711/150

(58) Field of Classification Search
None
See application file for complete search history.

(56) References Cited

U.S. PATENT DOCUMENTS

| | | | |
|---|---|---|---|
| 2006/0031844 A1* | 2/2006 | Dice et al. | 718/106 |
| 2006/0277374 A1* | 12/2006 | von Praun et al. | 711/152 |
| 2009/0007124 A1* | 1/2009 | Guo | 718/103 |
| 2009/0157944 A1* | 6/2009 | Robinson | 711/100 |
| 2010/0100709 A1* | 4/2010 | Yoshida | 712/205 |
| 2010/0106945 A1* | 4/2010 | Yoshida | 712/213 |
| 2010/0169579 A1* | 7/2010 | Sheaffer et al. | 711/141 |
| 2010/0332770 A1* | 12/2010 | Dice et al. | 711/148 |
| 2010/0333096 A1* | 12/2010 | Dice et al. | 718/102 |
| 2011/0072234 A1* | 3/2011 | Chinya et al. | 711/207 |
| 2011/0078385 A1* | 3/2011 | Lev et al. | 711/147 |
| 2011/0246724 A1* | 10/2011 | Marathe et al. | 711/147 |

OTHER PUBLICATIONS

Arvind et al, "Memory Model = Instruction Reordering + Store Atomicity", 2006, IEEE, pp. 1-12.*
Shen et al, "Commit-Reconcile & Fences (CRF): A New Memory Model for Architects and Compiler Writers", 1999, MIT, pp. 1-12 (plus 4 pages of cover sheets).*

* cited by examiner

*Primary Examiner* — Charles Swift
(74) *Attorney, Agent, or Firm* — Volpe and Koenig, P.C.

(57) ABSTRACT

Provided is a method of permitting the reordering of a visibility order of operations in a computer arrangement configured for permitting a first processor and a second processor threads to access a shared memory. The method includes receiving in a program order, a first and a second operation in a first thread and permitting the reordering of the visibility order for the operations in the shared memory based on the class of each operation. The visibility order determines the visibility in the shared memory, by a second thread, of stored results from the execution of the first and second operations.

18 Claims, 7 Drawing Sheets

Table 410

Second operation 450

| First Operation 440 | | Unordered Ld 455A | Unordered St 455B | LdOpSt 455C | LdAcq 455D | StRel 455E | LdAcqOp-StRel 455F | Sync 455G | Thread Barrier 455H |
|---|---|---|---|---|---|---|---|---|---|
| | Unordered Ld 445A | yes | yes | yes | yes | no | no | no | no |
| | Unordered St 445B | yes | yes | yes | yes | no | no | no | no |
| | LdOpSt 445C | yes | yes | yes | yes | no | no | no | no |
| | LdAcq 445D | no | no | no | no | no | no | no | no |
| | StRel 445E | yes | yes | yes | no | no | no | no | no |
| | LdAcqOp-StRel 445F | no | no | no | no | no | no | no | no |
| | Sync 445G | no | no | no | no | no | no | yes | yes |
| | Thread Barrier 445H | no | no | no | no | no | no | yes | yes |

FIG. 4

Table 510

| Fence types that order Future/Prior Operations | | Future Operation 550 | | |
|---|---|---|---|---|
| | | Unordered Ld, LdAcq 555A | UnorderedSt, StRel 555B | LdOpSt, Ld AcqOpStRel 555C |
| Prior Operation 540 | Unordered Ld, LdAcq 545A | LoadLoad | LoadStore | LoadLoad or LoadStore |
| | UnorderedSt, StRel 545B | StoreLoad | StoreStore | StoreLoad or StoreStore |
| | LdOpSt, LdAcqOpStRel 545C | LoadLoad or StoreLoad | LoadStore or StoreStore | Any |

VISIBILITY ORDERING IN A MEMORY MODEL FOR A UNIFIED COMPUTING SYSTEM

CROSS REFERENCE TO RELATED APPLICATIONS

This application claims the benefit of U.S. Provisional Application No. 61/617,470, filed on Mar. 29, 2012, which is incorporated herein by reference in its entirety.

BACKGROUND

1. Field

The present invention is generally directed to computing systems. More particularly, the present invention is directed towards an architecture for unifying the computational components within a computing system.

2. Related Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) efficient scheduling, (ii) providing quality of service (QoS) guarantees between processes, (iii) programming model, (iv) compiling to multiple target instruction set architectures (ISAs), and (v) separate memory systems,—all while minimizing power consumption.

These existing computing systems, however, rarely account for differences in classes of operations associated with multiple processors (and separate memory systems) configured for unified computing operations. As such, these existing computing systems are also unable to create order between these different classes of operation. This inability to account for the differences, and thus, not create order, between the classes of operations, can hamper overall system performance.

SUMMARY OF EMBODIMENTS

What is needed, therefore, are methods and systems of permitting the reordering of a visibility order of operations in a computer arrangement having GPU and CPU threads that access a shared memory in accordance with a unified memory model.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner.

Embodiments of the present invention, under certain circumstances, provide a method of permitting the reordering of a visibility order of operations in a computer arrangement configured for permitting threads from different processors (e.g., an APD and a CPU) to access a shared memory. The processors may be of different types (e.g. an APD and a CPU) or of the same type (e.g., two APD processors). The method includes receiving in a program order, a first and a second operation in a first thread and determining a class for each of the first and second operations. The method also includes permitting the reordering of the visibility order for the operations in the shared memory based on the determined class of each operation. The visibility order determines the visibility in the shared memory, by a second thread, of stored results from the execution of the first and second operations.

Further features and advantages of the present invention, as well as the structure and operation of various embodiments of the present invention, are described in detail below with reference to the accompanying drawings. The present invention is not limited to the specific embodiments described herein. The embodiments are presented for illustrative purposes only and so that readers will have multiple views enabling better perception of the present invention, which is broader than any particular embodiment. Additional embodiments will be apparent to persons skilled in the relevant art(s) based on the teachings set forth in this patent document.

BRIEF DESCRIPTION OF THE DRAWINGS/FIGURES

The accompanying drawings, which are incorporated herein and form part of the specification, illustrate embodiments and principles of the present invention. Together with the text description, they explain the principles of the present invention and enable a person skilled in the pertinent art to make and use the present invention. Various embodiments of the present invention are described below with reference to the drawings, wherein like reference numerals are used to refer to like elements throughout.

DETAILED DESCRIPTION

The term "embodiments of the present invention" does not require that all embodiments of the present invention include the discussed feature, advantage or mode of operation. Alternate embodiments may be devised without departing from the scope of the present invention, and well-known elements of the present invention may not be described in detail or may be omitted so as not to obscure the relevant details of the present invention. In addition, the terminology used herein is for the purpose of describing particular embodiments only and is not intended to be limiting of the present invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
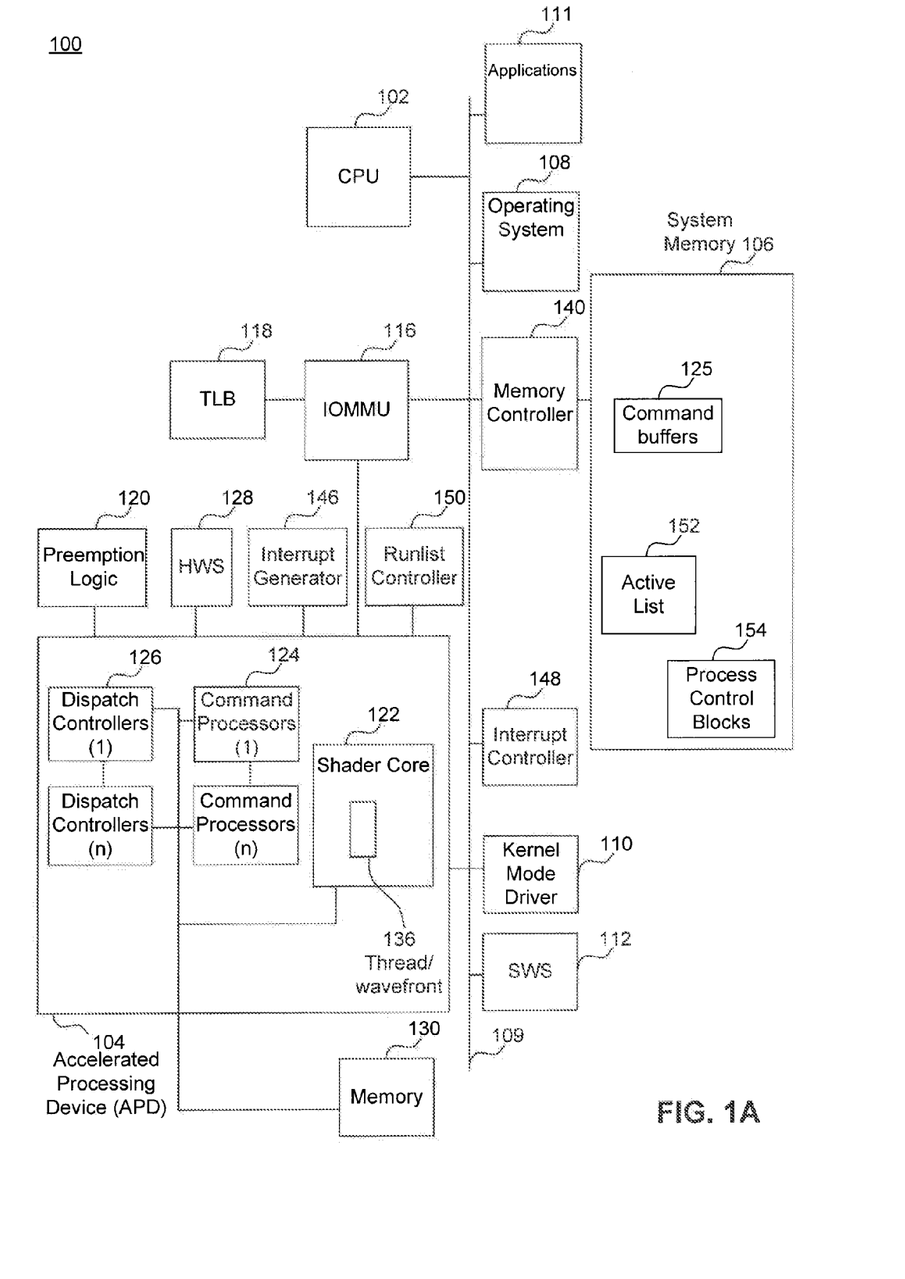
FIG. 1A is a block diagram of an illustrative processing system in accordance with embodiments of the present invention.

FIG. 1A is a block diagram of an exemplary unified computing system 100 that includes a CPU 102 and an APD 104. In an embodiment of the present invention, the system 100 is formed on a single silicon die, combining the CPU 102 and APD 104 to provide a unified programming and execution environment. This environment enables the APD to be used as fluidly as the CPU for some programming tasks. However, it is not an absolute requirement of this invention that the CPU and APD be formed on a single silicon die. In some embodiments, they may be formed separately and be mounted on the same or different substrates.

In one example, system 100 also includes a system memory 106, an operating system (OS) 108, and a communication infrastructure 109. The OS 108 and the communication infrastructure 109 are described in greater detail below.

The system 100 also includes a kernel mode driver (KMD) 110, a software scheduler (SWS) 112, and a memory management unit, such as input/output memory management unit (IOMMU) 116. CPU 102 and APD 104 can be implemented on a single integrated circuit chip or on multiple chips. A person skilled in the relevant art will appreciate that system 100 may include one or more software, hardware, and firmware components in addition to, or different from, that shown in the embodiment shown in FIG. 1A.

CPU 102 can include (not shown) one or more of a control processor, field programmable gate array (FPGA), application specific integrated circuit (ASIC), or digital signal processor (DSP). CPU 102, for example, executes the control logic, including the OS 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104. CPU 102 can include one or more single or multi core CPUs.

APD 104 includes its own compute units (not shown), such as, but not limited to, one or more single instruction multiple data (SIMD) processing cores. Each APD compute unit can include one or more of scalar and/or vector floating-point units and/or arithmetic and logic units (ALU). The APD compute unit can also include special purpose processing units (not shown) such as inverse-square root units and sine/cosine units. The APD compute units are referred to herein collectively as shader core 122.

Having one or more SIMD compute units, in general, makes APD 104 ideally suited for execution of data-parallel tasks such as are common in graphics processing.

A set of related operations executed on a compute unit can also be referred to as a compute kernel. In graphics pipeline operations, such as pixel processing, and other parallel computation operations, can require that the same instruction stream or compute kernel can be performed on streams or collections of input data elements. Respective instantiations of the same compute kernel can be executed concurrently on multiple compute units in shader core 122 in order to process such data elements in parallel. A single data item within a stream or collection to which a compute kernel is applied is referred to as a work-item. A set of work-items across which the instructions of a compute kernel are applied in lock-step within a single SIMD processing core is referred to as a thread. Stated another way, the term thread refers to a single instance of a program execution with a unique data state.

In an illustrative embodiment, each compute unit (e.g., SIMD processing core) can execute a respective instantiation of a particular thread or process to process incoming data.

A group of threads that are processed under a shared instruction state in a SIMD-style process are referred to as a wavefront. For example, shader core 122 can simultaneously execute a predetermined number of wavefronts 136, each wavefront 136 comprising a predetermined number of threads.

APD 104 includes its own memory, such as graphics memory 130. Graphics memory 130 provides a local memory for use during computations in APD 104, and each compute unit of the shader core 122 may have its own local data store (not shown). In one embodiment, APD 104 can include access to local graphics memory 130, as well as access to the system memory 106. In another embodiment, APD 104 can also include access to dynamic random access memory (DRAM) or other such memories attached directly to the APD separately from system memory 106.

APD 104 also includes a command processor (CP) 124. CP 124 controls the processing within APD 104. CP 124 also retrieves instructions to be executed from command buffers 125 in system memory 106 and coordinates the execution of those instructions on APD 104.

In one example, CPU 102 inputs commands based on applications 111 into appropriate command buffers 125. A plurality of command buffers 125 can be maintained with each process scheduled for execution on the APD having its own command buffer 125.

Command processor 124 can be implemented in hardware, firmware, or software, or a combination thereof. In one embodiment, command processor 124 is implemented as a RISC engine with microcode for implementing logic including scheduling logic.

APD 104 may also include a dispatch controller 126. Dispatch controller 126 includes logic to initiate threads and wavefronts in the shader core. In some embodiments, dispatch controller 126 can be implemented as part of command processor 124.

System 100 also includes a hardware scheduler (HWS) 128 for selecting a process from a run list 150 for execution on APD 104. HWS 128 can select processes from run list 150 using round robin methodology, based upon priority level, or based on other scheduling policies. By way of example, the priority level can be dynamically determined. HWS 128 can also include functionality to manage the run list, for example, by adding new processes and by deleting existing processes from a run-list. The run list management logic of HWS 128 is sometimes referred to as a run list controller (RLC).

In various embodiments of the present invention, when HWS 128 initiates the execution of a process from run list 150, CP 124 begins retrieving and executing instructions from the corresponding command buffer 125. In some instances, command processor 124 can generate one or more commands to be executed within APD 104, which correspond with each command received from CPU 102. In one embodiment, command processor 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the OS when interrupt events, such as page faults, are encountered by APD 104. For example, APD 104 can rely on interrupt generation logic within IOMMU 116 to create the page fault interrupts noted above.

APD 104 can also include preemption and context switch logic 120, which includes logic to preempt a process currently running within shader core 122. More specifically, context switch logic 120 can include functionality to coordinate the preemption, for example, by stopping the process and saving the current state of the process (e.g., shader core 122 state, CP 124 state).

Preemption and context switch logic 120 can also include logic to context switch another process into the APD 104. The functionality to context switch another process into running on the APD 104 may include instantiating the process, for example, through the command processor and dispatch controller to run on APD 104, restoring any previously saved state for that process, and starting its execution.

System memory 106 includes non-persistent memory such as DRAM. System memory 106 can store, e.g., processing logic instructions, constant values, and variable values during execution of portions of applications or other processing logic. For example, in one embodiment, parts of control logic to perform one or more operations on CPU 102 can reside within system memory 106 during execution of the respective portions of the operation by CPU 102. The term "processing logic" or "logic," as used herein, refer to control flow instructions, instructions for performing computations, and instructions for associated access to resources.

During execution, respective applications, OS functions, processing logic instructions, and system software can reside in system memory 106. Control logic instructions fundamental to OS 108 will generally reside in system memory 106 during execution. Other software instructions, including, for example, kernel mode driver 110 and software scheduler 112 can also reside in system memory 106 during execution of system 100.

System memory 106 includes command buffers 125 that are used by CPU 102 to send commands to APD 104. System memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to system memory 106 can be managed by a memory controller 140, which is coupled to system memory 106. For example, requests from CPU 102, or from other devices, for reading from or for writing to system memory 106 are managed by the memory controller 140.

IOMMU 116 is a multi-context memory management unit. IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in system memory 106.

Communication infrastructure 109 interconnects the components of system 100 as needed. Communication infrastructure 109 can include (not shown) one or more of a Peripheral Component Interconnect (PCI) bus, extended PCI (PCI-E) bus, advanced microcontroller bus architecture (AMBA) bus, advanced graphics port (AGP), or such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

OS 108 includes components and software/firmware providing functionality to manage the hardware components of system 100 and to provide common services. In various embodiments, processes defined by OS 108 can execute on CPU 102 and provide common services. These common services can include, for example, scheduling applications for execution within CPU 102, fault management, interrupt service, as well as processing the input and output of other applications.

In various embodiments, based on interrupts generated by an interrupt controller such as interrupt controller 148, OS 108 invokes an appropriate interrupt handling routine. For example, upon detecting a page fault interrupt, OS 108 may invoke an interrupt handler to initiate loading of the relevant page into system memory 106 and to update corresponding page tables.

OS 108 is configured to have functionality to protect system 100 by ensuring that access to hardware components is mediated through OS managed kernel functionality. In effect, OS 108 ensures that applications, such as applications 111, run on CPU 102 in user space. OS 108 also ensures that applications 111 invoke kernel functionality provided by the OS to access hardware and/or input/output functionality.

KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in system memory 106 of processes to be executed on APD 104. SWS 112 also selects a subset of the processes in active list 152 to be managed by HWS 128 in the hardware. In an illustrative embodiment, this two level run list of processes increases the flexibility of managing processes and enables the hardware to rapidly respond to changes in the processing environment. In another embodiment, information relevant for running each process on APD 104 is communicated from CPU 102 to APD 104 through process control blocks (PCB) 154.

Processing logic for applications, OS, and system software can include instructions specified in a programming language such as C and/or in a hardware description language such as Verilog, RTL, or netlists, to enable ultimately configuring a manufacturing process through the generation of maskworks/photomasks to generate a hardware device embodying aspects of the present invention described herein.

A person skilled in the relevant art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
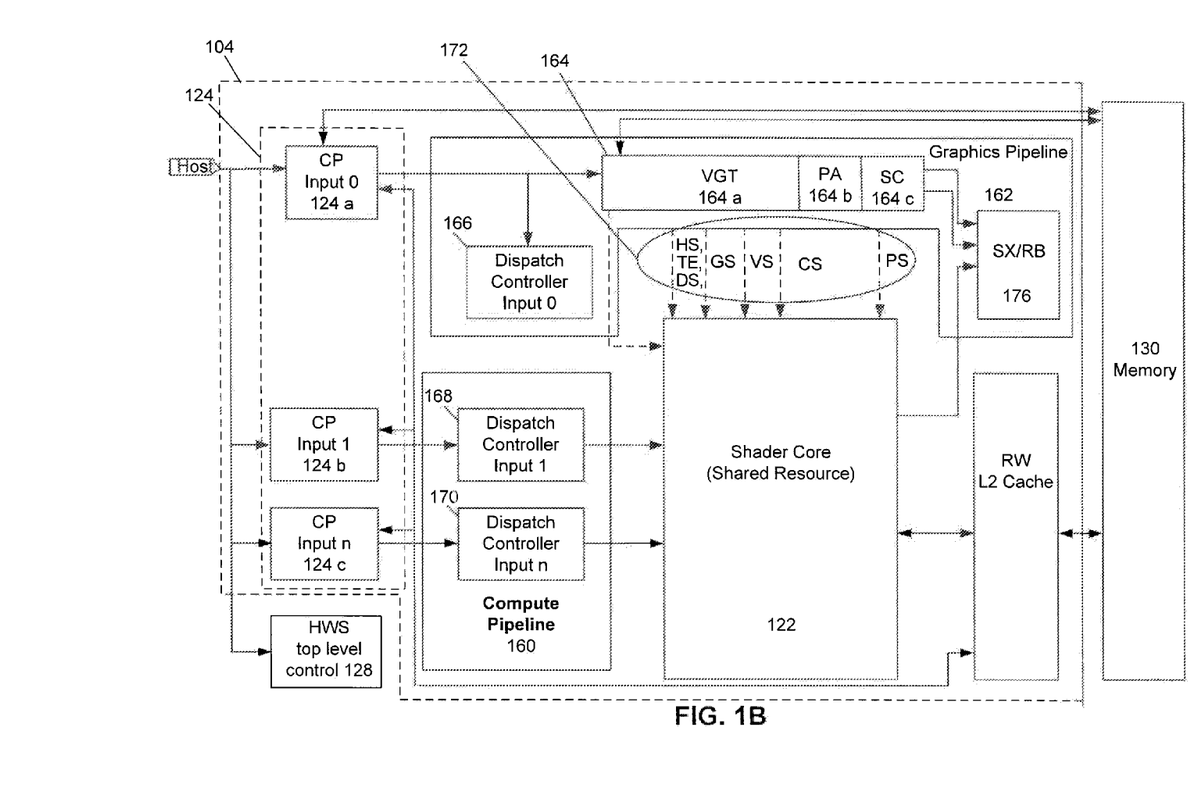
FIG. 1B is a block diagram of the APD illustrated in FIG. 1A, according to an embodiment.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

Figure 2:
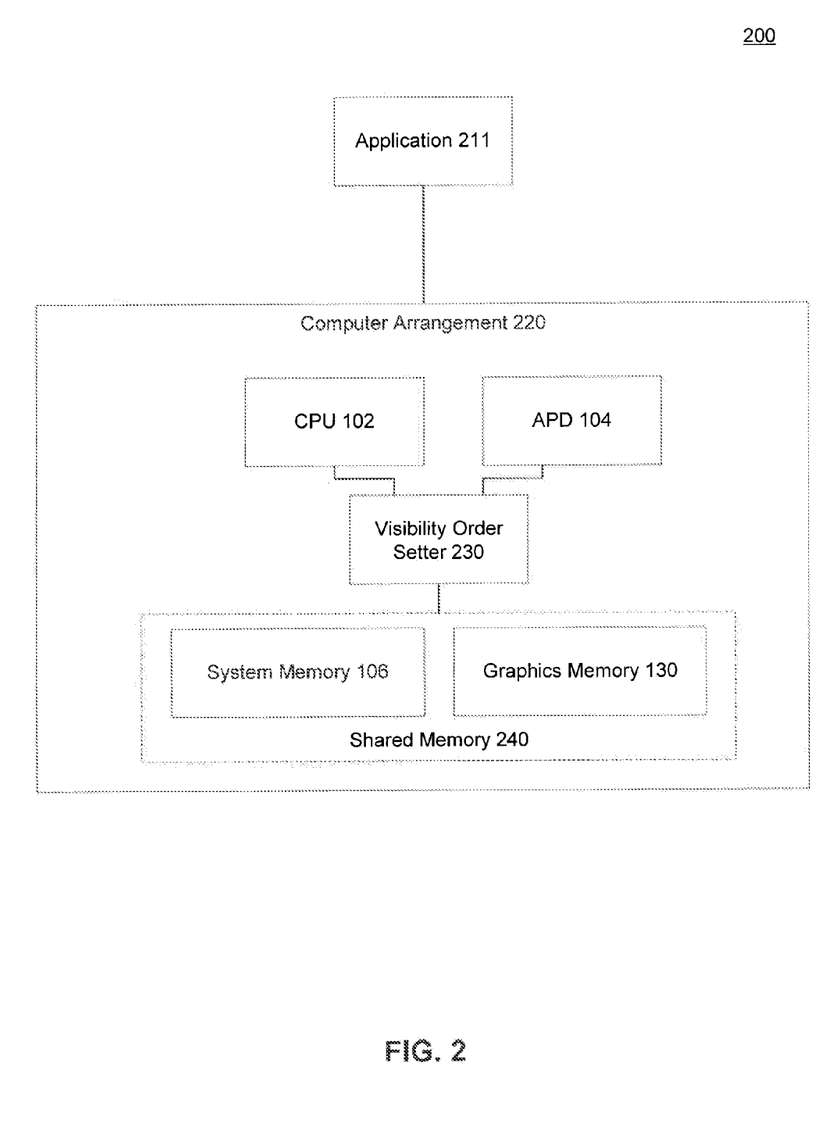
FIG. 2 is an additional view of the unified computing system illustrated in FIGS. 1A and 1B, in accordance with embodiments of the present invention.

FIG. 2 is an exemplary block diagram illustration of an example system architecture 200 in which embodiments of the present invention, or portions thereof, may be implemented. System architecture 200 includes application 211 coupled computer arrangement 220. In an embodiment, computer arrangement 220 has characteristics of unified computing system 100, described above. Some embodiments described herein describe aspects of a memory model for unified computing system 100—described above—a unified memory model.

Computer arrangement 220 includes CPU 102, APD 104, visibility permission setter 230 and shared memory 240. Shared memory 240 includes system memory 106 and graphics memory 130.

One aspect of the memory model for unified computing system 100 described herein is the setting of a visibility order for operations executed by CPU 102 and APD 104. As used typically herein, "visibility order of operations" refers to the observable order of memory operations as viewed by other operations executing in the same or different threads on one or more processors. In an exemplary operation of an embodiment described herein, the visibility order of operations determines the visibility of operations executed by a thread, of results stored in a shared memory from the execution of operations in another thread.

Generally speaking, in some embodiments, two operations from a thread are received in program order by a visibility permission setter, and a class for each received operation is determined. The visibility permission setter is configured to determine and set the visibility order for the received operations based on the determined class of each operation. When a second thread views the stored results of the two operations, the determined visibility order determines the order that the results of the first thread are perceived by operations in the second thread.

In an example in accordance with UCS 100, application 211 can have two memory operations (e.g., a first and a second memory operation) in a first thread processed by a processing element—either CPU 102 or APD 104. As the first and second memory operations are processed by the processing element, visibility permission setter 230 receives information about the operations. In another embodiment, visibility permission setter 230 is part of the thread processing steps inside the processing element. In yet another embodiment, visibility permission setter 230 receives the first and second operations, processes them and relays the results of the processing to an appropriate portion of shared memory 240.

Based on information about the two operations received by visibility permission setter 230, the visibility order of the two operations is determined and set. The operation of visibility permission setter 230 is described further below with the description of FIG. 3.

Figure 3:
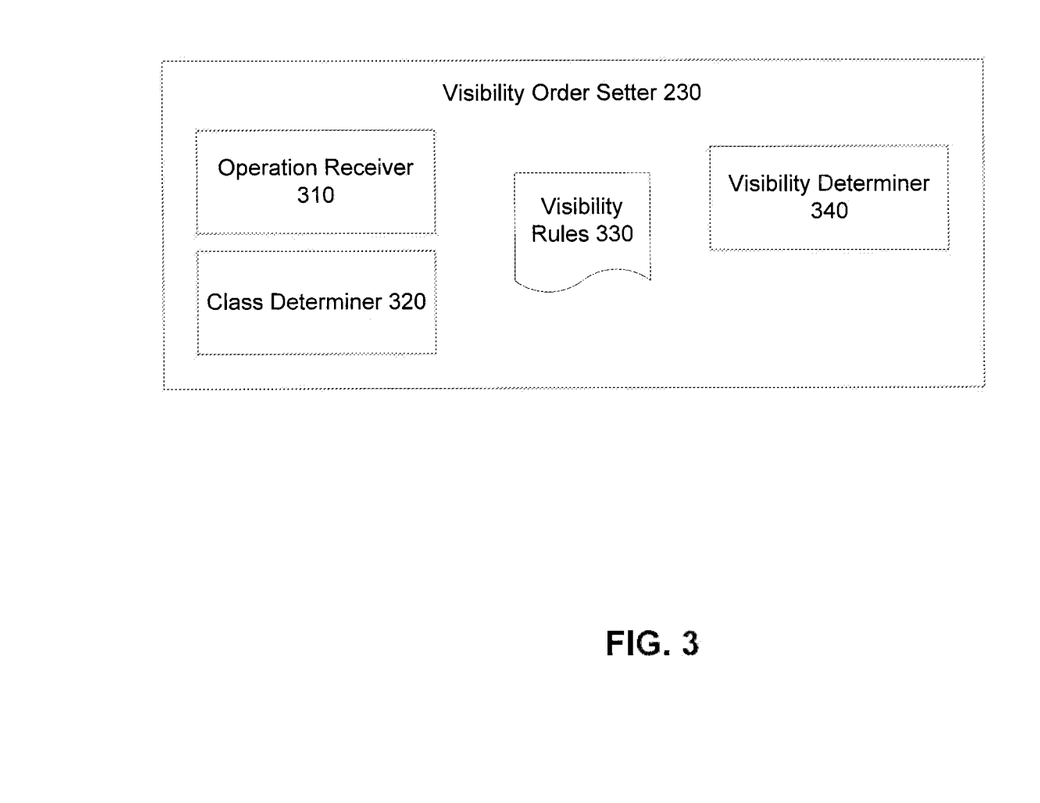
FIG. 3 is a more detailed block diagram of the visibility permission setter illustrated in FIG. 2, in accordance with embodiments of the present invention.

FIG. 3 is a more detailed view of visibility permission setter 230 according to an embodiment. Visibility permission setter 230 includes operation receiver 310, class determiner 320, visibility rules 330 and visibility determiner 340.

Continuing the example above, the operation of visibility permission setter 230 is further described in this section. In different embodiments, operation receiver 310 either receives information describing aspects of the first and second operations or receives the first and second operations for handling in a processing pipeline. Class determiner 320 is configured to determine a class of the received operations. Using visibility rules 330, visibility determiner 340, uses the determined class for each operation to determine the visibility of each operation. Examples of different types of operation classes and visibility determining considerations are discussed further below, with the descriptions of FIGS. 4 and 5.

Figure 4:
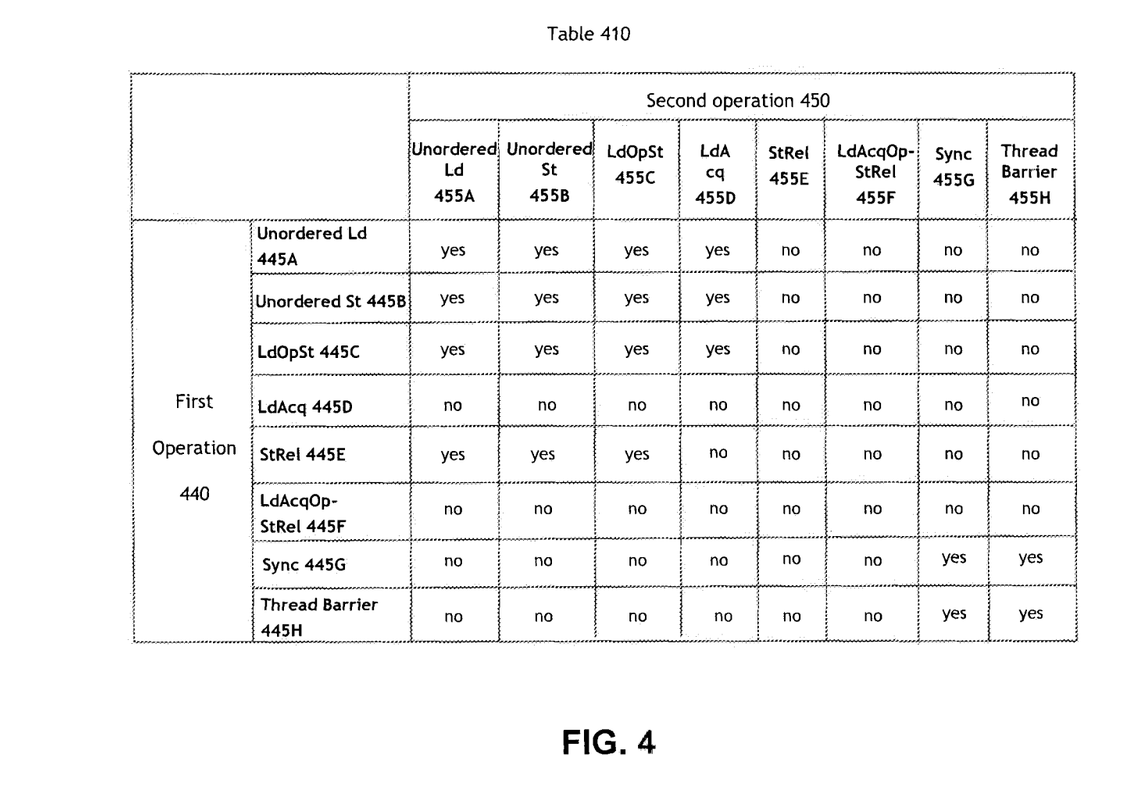
FIG. 4 is table listing illustrative relationships between classes of instructions, in accordance with embodiments of the present invention.

FIG. 4 depicts table 410 illustrating examples of classes of operations in a unified computing system environment, according to an embodiment. In general, FIG. 4 is approach for determining when to selectively permit the reordering the visibility order of two operations based on the class of the operations.

In an embodiment, permitted reorders can be determined based on the properties of each memory operation. One approach to comparing the properties of memory operations is to group memory operations into classes and compare the classes. For a particular operation, an operation class is determined for each instruction and these determined classes are compared to determine whether the visibility order of the operations can be reordered. It is important to note that FIG. 4 shows when reordering of a visibility order is permitted, not when it is mandated.

FIG. 4 provides different examples of classes of memory operations and visibility order aspects, according to an embodiment. In table 410, memory operation classes 445A-H and 455A-H are arranged such that one having skill in the relevant art(s), given the description herein, can determine whether some embodiments described herein permit the reordering of the initial visibility order of particular classes of operation. It is important to note that, in an embodiment, the memory operations permitted to have their global visibility order reordered reference different memory addresses.

In an embodiment, first operation 440 is first operation in the program order of a thread, and second operation 450 is the second operation in the program order of the thread. The first and second operations in a thread are received in program order and a class for each operation is determined. The initial global visibility order of first operation 440 and second operation 450 is set to the program order.

In an example reading of table 410 on FIG. 4, when first operation 440 in a program order, is an unordered store (Unordered St 445B) and the second operation is a LoadOpStore (LdOpSt 455C), the "yes" at the intersection of the instructions indicated that visibility reordering is permitted by an embodiment. In another example, when first operation 440 in a program order, is a load acquire (LdAcq 445D) and the second operation is any other listed operation 455A-H, the "no" at the intersection of the instructions indicates that visibility reordering is not permitted by an embodiment.

Example operations classes for an APD are listed on FIG. 4—first operation classes 445 and second operation classes 455. These example classes C1-C8 are shown on FIG. 4 and discussed below, along with example general principles.

C1. Unordered Ld 445A, 455A: Unordered Load Operation Class.

C2. Unordered St 445B, 455B: Unordered Store Operation Class.

C3. LdOpSt 445C, 455C: Load Operation Store Operation Class.

C4. LdAcq 445D, 455D: Load Acquire Operation Class.

C5. StRel 445E, 455E: Store Release Operation Class.

C6. LdAcqOp-StRel 445F, 455F: Load Acquire Operation-Store Release Class.

C7. Sync 445G, 455G—Sync Operation Class.

C8. Thread Barrier 445H, 455H—Thread Barrier Operation Class.

Some embodiments of the unified memory model described herein have general characteristics that guide whether to permit the reordering of the visibility order of memory operations in a UCS, such as UCS 100.

Aspects of write atomicity and value atomicity are discussed below. Some of the example visibility reordering rules set forth in the table of FIG. 4 are based on general principles outlined below.

In an embodiment, a global visibility order exists for all synchronizing loads and stores, LoadOpStores and globally visible unordered stores, to all addresses, such that the loads return the value of the last store, and the order of all synchronizing loads and stores is consistent with the program order of each thread.

Only synchronizing loads and stores are sequentially consistent. Other gore operations are included in this property because they may feed synchronizing loads. Synchronizing stores satisfying synchronizing loads should be the standard use model. For synchronizing operations, the visibility order is just an interleaving of each thread's program order.

In an embodiment, store operations performed by both the APD and the CPU are write atomic. As used typically herein, write atomicity describes a visibility approach where the result of a store operation becomes visible to all reading processes simultaneously. Having write-atomicity for store operations can beneficially avoid having two threads with different visibility orders for two respective stores, whether to the same or different addresses. An approach used by an embodiment to achieve write atomicity is to maintain an order for different types of load operations.

Loads and stores aligned to their natural datatype are handled atomically: Either all of the results of an operation are stored/loaded or none of the results are stored/loaded, respectively. Partial results cannot be created by a stole or loaded by a load operation. Partial results cannot be combined into a result less than the whole. As used typically herein, atomic Load plus Store "LoadOpStore" is used instead of the common term "Atomic" to identify operations that atomically act as both a load and store.

As discussed below, in an embodiment, all classes of loads have naturally aligned value atomicity. Value atomicity can also apply to each loaded fragment of an unaligned load operation.

As used typically herein, a load operation class includes memory operations that load values from memory storage locations. Some embodiments address the visibility reordering of two classes of load operations: an unordered load operation class and a load acquire operation class (also termed a "synchronizing load operation class," and discussed below). Generally speaking, in an embodiment, with respect to value atomicity as described above, loads and stores aligned to their natural data type complete atomically, e.g., either all of the data stored is visible, or none of it. Neither partial results created by a store nor results based on the merger of various partial results are visible.

Each load operation class has different memory semantics. Illustrative types of load operations used by embodiments of a UCS are described below.

As used typically herein, an unordered load operation class is a memory operation that loads a value without having a specified order with respect to other memory operations in the same and different threads.

By way of example, the following non-limiting illustrative listing depicts unaligned loads UL1-UL5. These unaligned loads UL1-UL5 broadly describes visibility ordering characteristics of an unordered load operation class in embodiments:

UL1. Value atomicity is applied to the unordered load operation class when operation length is up to a preset maximum number of bits and in a naturally aligned window. Aligned unordered loads and stores, aligned to their natural data type, up to a preset number of bits, have value atomicity but no implicit ordering between operations. In an embodiment, the preset number of bits is 64, while in other embodiments, a different preset number is used.

UL2. Unaligned Loads or loads of more than a preset minimum number of bits can be fragmented into unordered naturally aligned chunks of a size equal to the preset minimum number of bits. In an embodiment, the preset minimum number of bits is 64, while in another embodiment, a different preset minimum number is used. Unaligned and unordered loads and stores have no value atomicity and no implicit ordering. Sub-events for the unordered load operation class have value atomicity.

UL3. Each chunk described in UL2 above is has value atomicity. No visibility ordering constraints are applied between unordered memory operations. An unordered load operation class operation is allowed to see the results of its own or a different thread's store early (before the store is globally visible).

UL4. Operations of the unordered load class can be reordered in the global visibility order earlier or later than the set program order. The allowed reorder is bounded by the limits of prior operations discussed below, such as: acquire, fence, sync, thread barrier. The allowed reorder is also bounded by the limits of subsequent operations discussed below, such as: release, fence, Sync, thread barrier and the same-address single thread program order.

UL5. Operations of the unordered load, operation class are recognized by the UCS global visibility order discussed herein, but are allowed to return the value of either the last prior globally visible store or a locally visible store. Generally speaking, local visibility can only precede global visibility.

As used typically herein, a load acquire operation is related to the store release operation described below, and is a load operation that ensures that other operations complete, only after it completes. A load acquire can also be termed a synchronizing load, such load being a load operation directed to a synchronized variable.

In an embodiment, the load acquire operation class has the same characteristics as the unordered load operation class, with the following non-limiting, illustrative exceptions LA1-LA4 listed below:

LA1. Load acquires are not allowed to see the result of their own or other memory operations on other thread's stores early (before, for example, the corresponding store is globally visible).

LA2. Aligned synchronizing loads and stores have value atomicity and implicit ordering between other synchronizing loads and stores, as well as implicit order against prior and future unordered loads and stores (see FIG. 4). Loads and stores to synchronizing variables are sequentially consistent.

LA3. Load acquires create ordering constraints between themselves and other memory related operations—e.g., as depicted on FIG. 4, no reordering is permitted for any listed memory operation.

LA4. An operation of the load acquire class, or fence operation against future loads, will guarantee that all prior globally visible stores are seen by future loads. Operations of the thread barrier and sync operation classes, as discussed below, provide the same guarantee to future loads, while also forcing prior stores to be globally visible, this being important for the operation of spin loops. In an embodiment, a spin loop uses an operation of the load acquire class.

As used typically herein, a store operation class is a memory operation that stores a value at a memory location. Some embodiments address the visibility reordering of two classes of store operations: an unordered store operation class and a store release operation class. Each has different memory semantics. The following non-limiting, illustrative list S1-S5 broadly describes visibility ordering characteristics of store operation classes in embodiments:

S1. All forms of stores have naturally aligned value atomicity of a predetermined bit length. In an embodiment, this predetermined length is 64 bits. This property also applies to each fragment of an unaligned store discussed below.

S2. Stores are only visible, locally or globally, after data and control dependencies are fully resolved. In an embodiment, store visibility is not allowed to be speculative. This prohibition of speculative store visibility acts to define the bounds of local store visibility for unordered loads.

S3. Generally speaking, in addition to having local store visibility, unordered store operations can be reordered.

S4. UCSIL and native x86 Stores are eventually seen by all native x86 threads, regardless of the load operation class of the operation used.

S5. UCSIL and native x86 Stores are not guaranteed to be eventually seen by all UCSIL threads, if those threads only use operations of the unordered loads class.

In addition, notwithstanding the generalizations noted above with respect to embodiments of store operation classes, it is important to note that other embodiments of the specific store operation classes noted below do not necessarily have these characteristics.

The following non-limiting, illustrative list US1-US6 broadly describes visibility ordering characteristics of an unordered store operation class in embodiments:

US1. As with the unordered load class of operations described above, value atomicity is applied to the unordered store operation class when operation length is up to a preset maximum number of bits and in a naturally aligned window. In an embodiment, the preset number of bits is 64, while in another embodiment, a different preset number is used.

US2. As with the unordered load class of operations described above, operations of the unordered store class can be reordered in the global visibility order earlier or later than the set program order. The allowed reorder is bounded by the limits of prior operations discussed below, such as: acquire, fence, sync, thread barrier. The allowed reorder is also bounded by the limits of subsequent operations discussed below, such as: release, fence, sync, thread barrier and the same-address single thread program order.

US3. As with the unordered load class of operations described above, unaligned stores or stores of more than a preset minimum number of bits can be fragmented into unordered naturally aligned chunks of a size equal to the preset minimum number of bits. In an embodiment, the preset minimum number of bits is 64, while in another embodiment, a different preset minimum number is used. Unaligned and unordered loads and stores have no value atomicity and no implicit ordering. Sub-events for the unordered load operation class have value atomicity.

US4. Each chunk described in US3 above is has value atomicity. As noted above, no visibility ordering constraints are applied between unordered memory operations.

US5. An operation of the unordered store operation class is allowed to satisfy an operation of the unordered load operation class from its own or a different thread (before the unordered store operation is globally visible).

US6. An operation of the unordered store operation class is not allowed to fulfill an atomic load from its own thread (before the store is globally visible).

As used typically herein, a store release operation is related to the load acquire operation described above, and is a store operation that ensures that other operations complete, only after it completes. A store release can also be termed a synchronizing store, such store being a store operation directed to a synchronized variable.

As with the general visibility order characteristics of the unordered load class of operations described above, aligned synchronizing stores have value atomicity and implicit ordering between other synchronizing loads and stores, as well as implicit order against prior and future unordered loads and stores (see FIG. 4). Loads and stores to synchronizing variables are sequentially consistent.

In an embodiment, the store release operation class has the same characteristics as the unordered store class described above, with the following non-limiting, illustrative exceptions SR1-SR5 listed below:

SR1. Store releases are not allowed to fulfill any loads from their own or other threads early (before the store is globally visible).

SR2. As shown on FIG. 4, store releases create ordering constraints between themselves and other memory related operations.

SR3. Operations of the store release class can be completed by being enqueued in a store buffer, allowing itself or others memory operations to see its results "early." If required, a store buffer bypass can be applied to associated load operations before the store release is set to be globally visible.

SR4. Both the load acquire and store release operations classes are atomic operations, in terms of visibility to each other, and any other load or store operation classes. Store release operation class operations are prevented from seeing their own write early. Other operations are also prevented from seeing store release operation class results stored early.

SR5. No store-load forwarding is applied to store release operation class results until an associated store release operation exits a store buffer, just like CAS or XCHG or LoadOpStore.

As used typically herein, LoadOpStore (also termed load-op-store and atomic load-store) operations, are operations that use a memory location as both a source and a target. Some embodiments address the visibility reordering of two classes of LoadOpStore operations: an unordered LoadOpStore operation class and a LoadAcquireOpStoreRelease operation class.

The following non-limiting, illustrative list LOS1-LOS6 broadly describes visibility ordering characteristics shared by LoadOpStore operation classes in embodiments:

LOS1. In an embodiment, LoadOpStore operation class operations are generally executed atomically such that it is not possible for any thread in the system to observe or modify the memory location during the LoadOpStore execution sequence.

LOS2. Load-Operation-Store Atomicity: A load, compute operation, and store appear to complete as one atomic event in the context of all other memory model properties. In an embodiment of the LoadOpStore operation, the above-described properties load operations and store operations apply.

LOS3. A LoadOpStore class operation does not allow any store to occur between its Load and Store. In an embodiment, the load/store pair of operations is indivisible The store portion of the operation can be conditional.

LOS4. LoadOpStore can guarantee forward progress in an application. If multiple LoadOpStore are used, some LoadOpStores will generally succeed, even if all are conditional. Also, there should be no spurious failures where a LoadOpStore returns a value inconsistent with a global visibility order, regardless of whether it succeeds or fails.

LOS5. A LoadOpStore does not see the writes of its thread or other thread's writes early. LoadOpStore is can be beneficially used for multi-threaded atomic increments, where a result is not needed until the completion of a process.

LOS6. Generally speaking, when executing a LoadOpStore class operation (e.g., XCHG or CAS) typical hardware cannot complete the operation until it gets the cache line in the "M state" (with write-invalidate protocols). Stated differently, a LoadOpStore cannot complete while sitting in a store buffer, with others seeing its write "early" before it gets the protocol's M state. Stated yet another way, the combined atomicity requirement and globally visibility order requires no other loads or stores could be ordered between the load and store of the LoadOpStore—local only visibility of the store portion is not allowed (another load can't get between the two operations).

As used typically herein, an "unordered" LoadOpStore operation class is an execution of a LoadOpStore operation without a visibility order set with respect to other program threads. The following non-limiting, illustrative list ULOS1-ULOS4 broadly describes visibility ordering characteristics of unordered LoadOpStore operation classes in embodiments:

ULOS1. The execution sequence of an unordered LoadOpStore operation has value atomicity.

ULOS2. Unordered LoadOpStore operations that are unaligned are not allowed and can result in undefined behavior or an exception ULOS3. The load in the unordered LoadOpStore sequence can only be fulfilled from data written by globally visible stores.

ULOS4. There is no visibility ordering constraints between unordered LoadOpStore memory operations.

As used typically herein, a LoadAcquireOpStoreRelease operation class is a LoadOpStore operation that has aspects synchronized with other threads. A LoadAcquireOpStoreRelease can also be termed a synchronizing LoadOpStore, such LoadOpStore being a LoadOpStore operation directed to a synchronized variable.

In an embodiment, the LoadAcquireOpStoreRelease operation class has the same characteristics as the unordered LoadOpStore class described above, with the following non-limiting, illustrative exceptions E1-E2 listed below:

E1. Visibility ordering constraints are applied to synchronizing LoadOpStore operations between themselves and other memory related operations in the same thread and other threads.

E2. The store portion of the synchronizing LoadOpStore sequence cannot fulfill any loads from the same or other threads early (before the store is globally visible).

Figure 5:
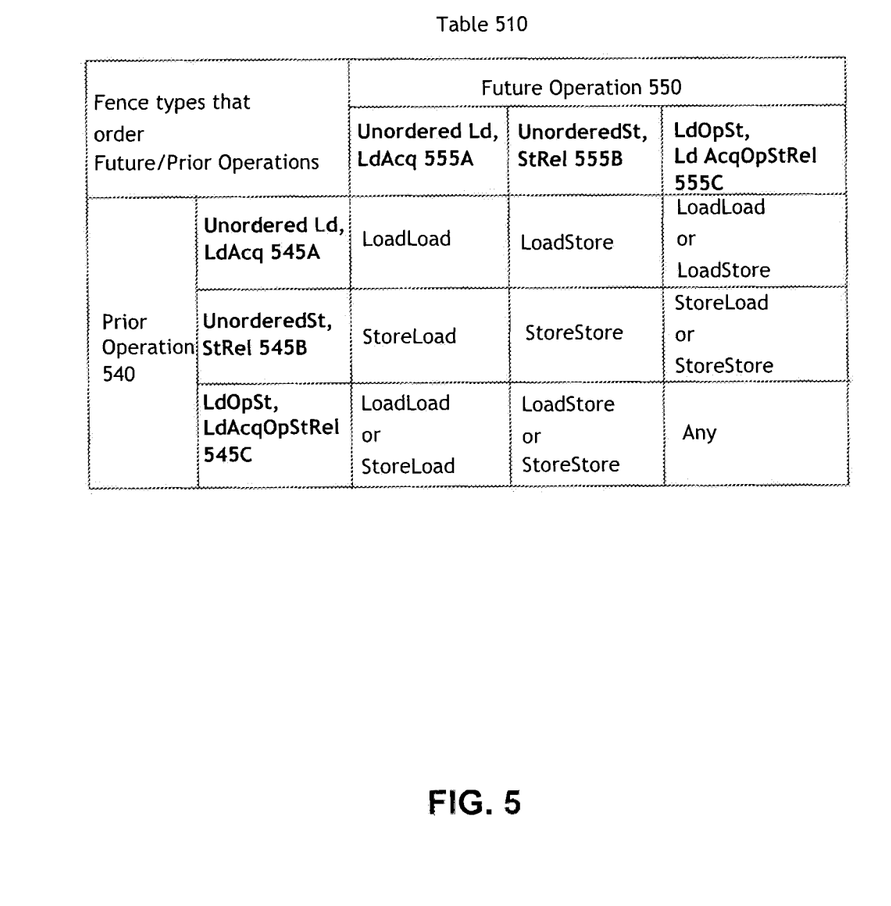
FIG. 5 is a table listing illustrative relationships between aspects of programmatic operations, in accordance with embodiments of the present invention.

FIG. 5 depicts a table having example fence operation types that order future and prior memory operations, according to an embodiment. As used typically herein, fence operations are operations that enforce a visibility ordering constraint on memory instructions issued before and after the fence. Fence operations are also known in the relevant art(s) as memory barriers, members and memory fences.

The following non-limiting, illustrative list F1-F8 broadly describes visibility ordering characteristics of operations of a fence operation class in embodiments:

F1. The fence operation class has operations that have four individual ordering requirements/attributes that can be combined: LoadLoad, LoadStore, StoreLoad, and StoreStore.

F2. Generally, operations of the fence operation class are non-executable, fences being used to create visibility ordering relationships between prior and subsequent memory operations. Operations of the fence operation class do not enforce visibility. In an embodiment, as discussed below, operations of the sync operation class can be used to enforce visibility.

F3. Operations of the fence operation class can be predicated and used in conditional code. Ordering constraints imposed by operations in the fence operation class are the union of the specified behavior of each applied fence attribute. As discussed below, FIG. 5 specifies the fence ordering value for each attribute combination.

F4. Fence operation class operations can be reordered from their program order and combined.

F5. Reorder of operations of the fence operation class is limited to the program order bounds of prior and future operations specified by the fence operation.

F6. The combined OR of a set of Fences is the OR of all pair wise "no" values for reordering loads and stores, as shown in FIG. 4.

Returning to FIG. 5, table 510 depicts a table having prior operation class 540 and future operation class 550. Table 510 provides non-limiting, illustrative examples of fence operation attributes, and how applied fence attributes can enforce an ordering constraint on future operation 550.

In table 510, prior operation classes 545A-C and future operation classes 555A-C, are arranged such that one having skill in the relevant art(s), given the description herein, can determine whether some embodiments of fence operations described herein enforce a visibility ordering constraint on particular future operations 550.

In an embodiment, prior operation class 540 is the class of a prior operation in the program order of a thread, and future operation class 550 is a memory operation to be executed in the future. When a memory operation 545A-C is used, applying an attribute (also termed "prior/future specifier") listed in the operation row allows a visibility ordering constraint to be applied to the future operation class 555A-C in the column associated with the attribute. In an example reading of table 510, when prior operation 540 is an unordered load (Unordered Ld/LdAcq 545A) and future operation class 550 to be visibility order constrained is a LoadOpStore (LdOpSt, LdAcqOpStRel 555C), the specified attributes are shown at the intersection of the instructions as "LoadLoad or LoadStore."

Prior and future operations are visibility ordered with respect to the applied fence. The fence is created in program order, and completes after guaranteeing its order rules will be followed for future visibility.

A "fence completion" rule guarantees events specified as "first" will be become globally visible before any future event specified as 'second' becomes locally or globally visible. A fence completion does not necessarily mean that an associated operation has completed to become global visible.

Future or prior store ordering covers all local and global visibility for stores from the thread executing the fence. Using an operation with any combination of the attributes is valid, specifying none of the attributes is a no-operation (NOP). The following non-limiting, illustrative list describes example global visibility characteristics the four fence attributes noted above:

A1. LoadLoad Fence: When applied, prior loads must be globally visible before subsequent loads.

A2. LoadStore Fence: When applied, prior loads must be globally visible before subsequent stores.

A3. StoreLoad Fence: When applied, prior stores must be globally visible before subsequent loads.

A4. StoreStore Fence: When applied, prior stores must be globally visible before subsequent stores.

As used typically herein, a thread sync (sync 445G) operation class includes memory operations that are configured to stall the issue of operations from threads based on different criteria, for example, the visibility order of the operations. Some embodiments address the visibility reordering of two types of sync operation classes: a local sync operation class and a global sync operation class. The following is a non-limiting, illustrative description of visibility ordering characteristics of operations of a sync operation class in embodiments.

Both the sync operation class and the thread barrier operation class are described below and have some properties of fence operations classes described above. In addition, operations of the sync operation class stall operation issue for all affected threads until all prior stores have become globally visible, and all prior loads have completed, in all of those threads. Sync operations can be predicated and used in conditional code.

When applied, a global sync forces a thread to wait until all of its prior loads and stores are globally visible, acting with the effect of a fully specified fence, as described above.

The operation (also termed, workgroup sync or sync.local) is used, in some circumstances, to provide increased performance as compared to global sync, local sync forces a thread to wait until all of its prior loads and stores meet the definitions of global visibility, but only for threads within a work group. The effect of this operation can be described as a third, intermediate level of visibility between the local visibility and the global visibility previously described. Stated another way, with a local sync, global visibility rules are used with a reduced group of operations and threads. It should be noted however, that globally visible or locally visible, stores from outside the workgroup may still be part of the visibility order.

As used typically herein, a thread barrier operation class refers to a memory operation allowing the coordinating of memory operations across threads. Some embodiments address the visibility reordering of thread barrier operation classes.

In one embodiment of UCS, there are two thread barriers implemented: local thread barrier and global thread barrier. Both thread barriers vary in the scope of threads whose visibility they affect, but the barrier behavior for both is constrained to a workgroup.

Figure 6:
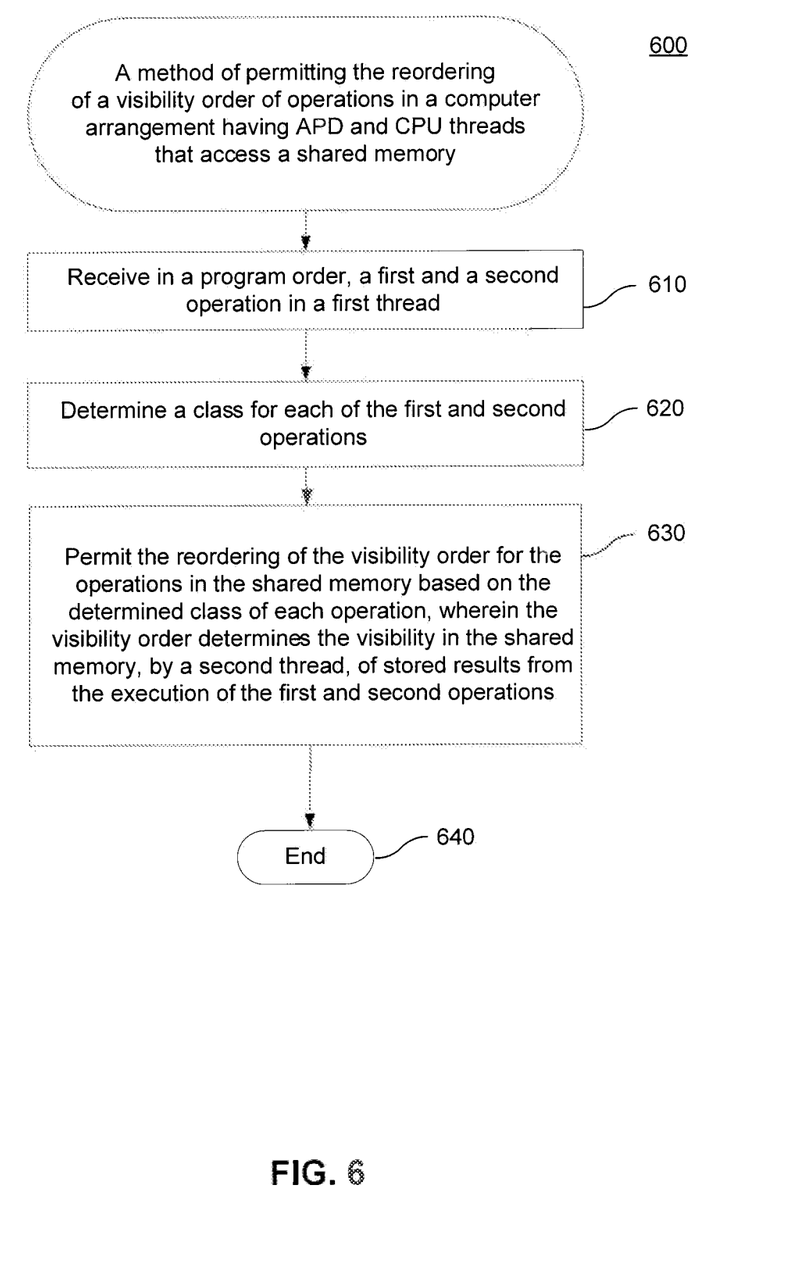
FIG. 6 shows a flowchart illustrating a method of permitting the reordering of a visibility order of operations in a computer arrangement having APD and CPU threads that access a shared memory.

FIG. 6 is a more detailed illustration of exemplary operation of embodiments described herein. In FIG. 6, a method 600 of permitting the reordering of a visibility order of operations in a computer arrangement having APD and CPU threads that access a shared memory in accordance with a unified memory model, is shown.

Initially, as shown in stage 610 in FIG. 6, a first and a second operation are received, in a program order, in a first thread. For example, in an embodiment, a first and second operation are received at a visibility permission setter, e.g., visibility permission setter 230 from FIG. 2, from an application, e.g., application 211.

At stage 620, a class for each of the first and second operations is determined. For example, in an embodiment, a class determiner, e.g., class determiner 320 in permission setter 230, determines the class of the received operations.

At stage 630, the reordering of the visibility order for the operations in the shared memory is permitted based on the determined class of each operation. For example, in an embodiment, in a computer arrangement, e.g., computer arrangement 220, visibility permission setter 230 permits the reordering of received memory operations, e.g., memory operations received from application 211, noted above. After stage 630, method 600 ends.

The foregoing description of the specific embodiments will so fully reveal the general nature of the present invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method, comprising:
  receiving, in a program order, a first and a second operations in a first thread;
    determining a class of each of the first and second operations;
    comparing the determined classes of the first and second operations; and
    permitting reordering of visibility order for the first and second operations in a shared memory based on the comparison of the determined classes, wherein the visibility order determines visibility in the shared memory, by a second thread, of stored results from execution of the first and second operations;
    wherein the visibility order is not permitted to change from the program order of the first and second operations when one of the first and second operations is of a synchronization class of operations.

2. The method of claim 1, wherein the visibility order is a global visibility order.

3. The method of claim 1, wherein the synchronized classes of operations comprise a load acquire operation class, and wherein an operation of the load acquire operation class is prohibited from loading data that is not globally visible.

4. The method of claim 1, wherein the synchronized classes of operations comprise a load acquire operation class, and wherein an operation of the load acquire operation class is prohibited from loading data that is not globally visible.

5. The method of claim 1, wherein the synchronized classes of operations comprise a global sync operation class, and wherein when one of the operations is of the global sync operation class, the first thread must wait until data operated on by all prior load and store operations are globally visible.

6. The method of claim 1, wherein the synchronized classes of operations comprise a local sync operation class, wherein when one of the operations is of the local sync operation class and the first thread is a first processor thread, the first thread must wait until data operated on by prior load and store operations by a first group of threads are globally visible, and wherein the first group of threads corresponds to a group of threads from a first processor work-group.

7. The method of claim 1, wherein the visibility order of the first and second operations does not correspond to the program order of the operations when both the first and second operations are of an unordered class of operations.

8. The method of claim 1, wherein the first thread is a thread from the first processor and the second thread is a thread from the second processor.

9. The method of claim 8 wherein the first processor comprises a processor of a first type and wherein the second processor comprises a processor of a second, different type.

10. The method of claim 8 wherein the first processor comprises a processor of a first type and wherein the second processor comprises a processor of the first type.

11. An apparatus comprising:
  a shared memory; and one or more computing devices configured to:
    receive, in a program order, a first and a second operation in a first thread;
    determine a class for each of the first and second operations and compare the determined classes of the first and second operations; and
    permit reordering of visibility order for the first and second operations in the shared memory, based on the comparison of the determined classes, wherein the visibility order determines visibility in the shared memory, by a second thread, of stored results from execution of the first and second operations;
    wherein the one or more computing devices are further configured not to permit a change to the visibility order for the operations when one of the first and second operation is of a synchronization class of operations.

12. The apparatus of claim 11, wherein the visibility order is a global visibility order.

13. The apparatus of claim 11, wherein the synchronized classes of operations comprise a store release operation class, and wherein data stored by an operation of the store release operation class cannot be used by other operations before the stored data is globally visible.

14. The apparatus of claim 11, wherein the synchronized classes of operations comprise a load acquire operation class, and wherein an operation of the load acquire operation class is prohibited from loading data that is not globally visible.

15. The apparatus of claim 11, wherein the synchronized classes of operations comprise a global sync operation class, and wherein when one of the operations is of the global sync operation class, the first thread must wait until data operated on by all prior load and store operations are globally visible.

16. The apparatus of claim 11, wherein the synchronized classes of operations comprise a local sync operation class, wherein when one of the operations is of the local sync operation class and the first thread is a first processor thread, the first thread must wait until data operated on by prior load and store operations by a first group of threads are globally visible, and wherein the first group of threads corresponds to a group of threads from a first processor work-group.

17. The apparatus of claim 11, wherein the one or more computing devices are further configured to permit a change to the visibility order for the operations when both the first and second operations are of an unordered class of operations.

18. The apparatus of claim 11, wherein one of the first and the second threads is a central processing unit (CPU) thread and the other of the first and the second threads is an accelerated processing device (APD) thread.

* * * * *